April 28, 1964      K. KRAEMER      3,130,607
TRANSMISSION ASSEMBLY
Filed Sept. 4, 1962      2 Sheets-Sheet 1
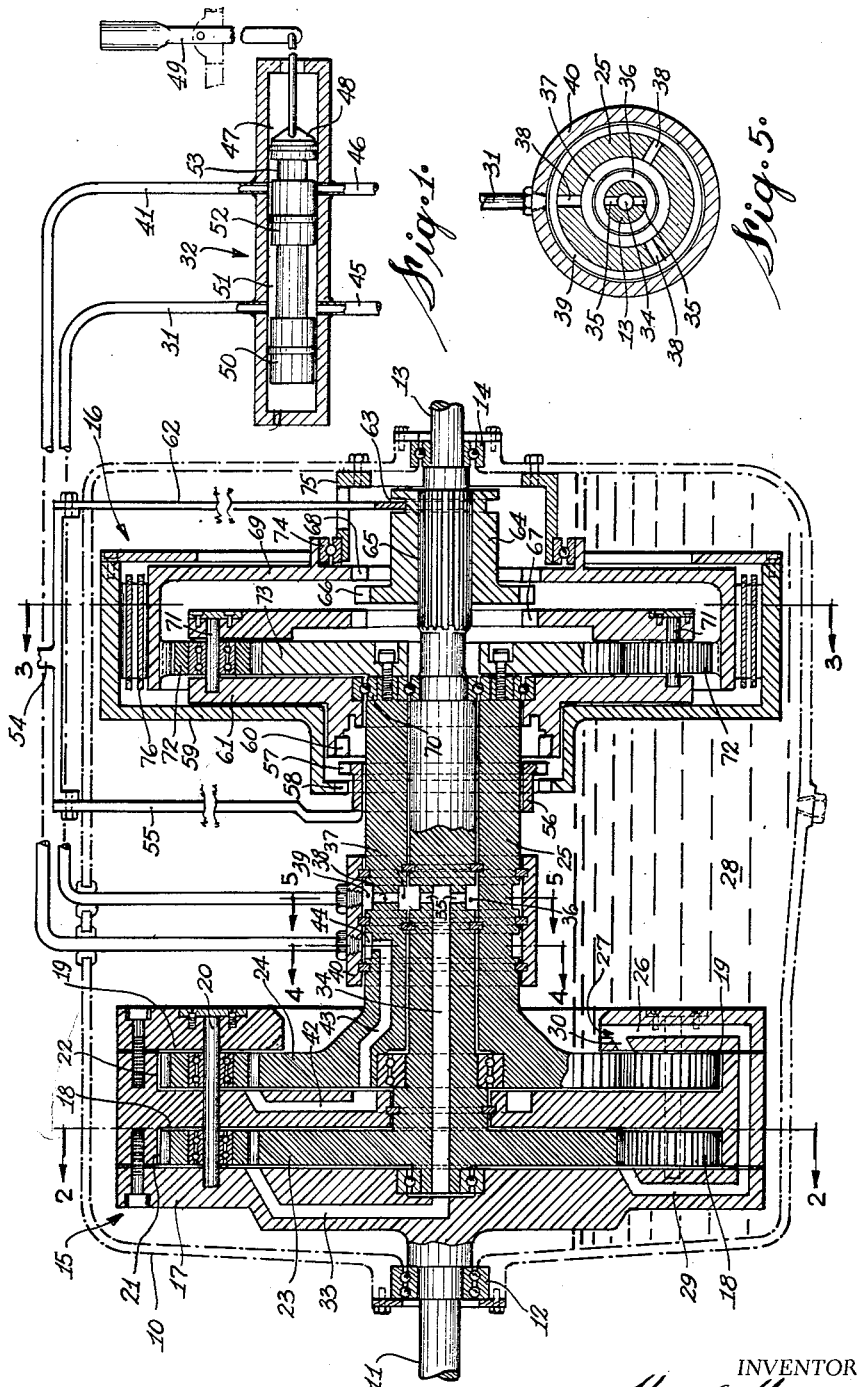
INVENTOR
Karl Kraemer
BY Harold A. Weir
PATENT AGENT

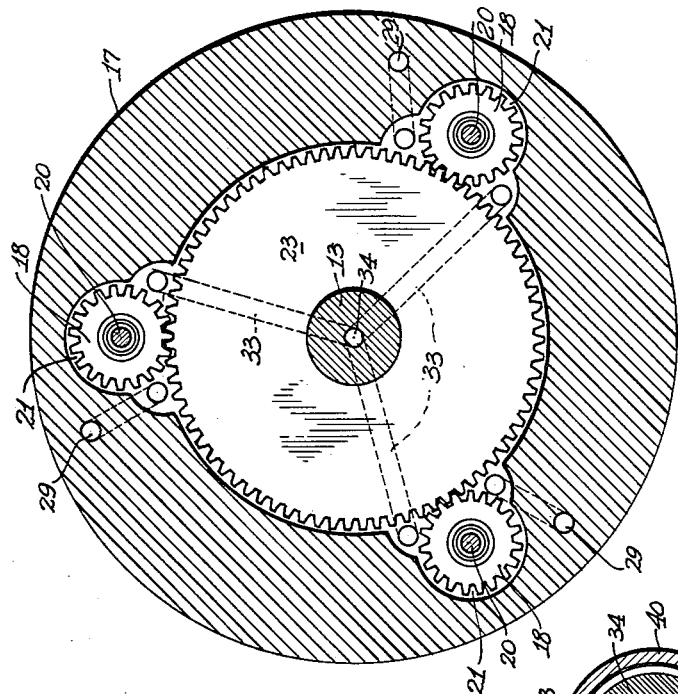
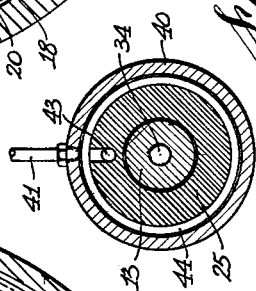
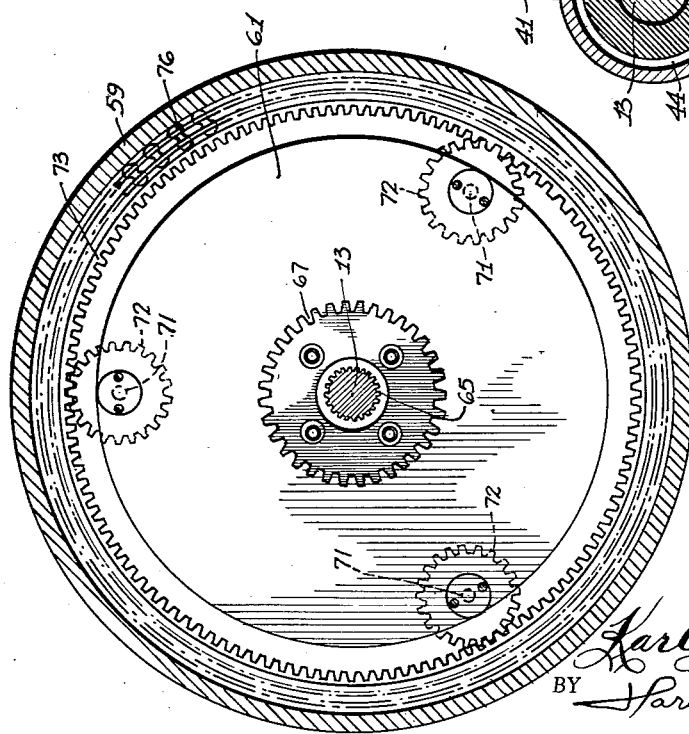

United States Patent Office 3,130,607
Patented Apr. 28, 1964

3,130,607
TRANSMISSION ASSEMBLY
Karl Kraemer, 10 Westglen Crescent,
Calgary, Alberta, Canada
Filed Sept. 4, 1962, Ser. No. 221,122
4 Claims. (Cl. 74—765)

This invention relates to transmission assemblies.

It is an object of this invention to provide a transmission of fluid coupling type, which is of simplified structure and manufacture, which has a high operating efficiency, which may be readily associated with the power plant and driving elements of a motor vehicle or the like, and which is subject to actuation in a convenient manner.

The invention will be described with reference to the accompanying drawings, in which:

FIGURE 1 is a sectional side elevation of a transmission assembly in accordance with the invention, FIGURE 2 is a section on line 2—2 of FIGURE 1, FIGURE 3 is a section on line 3—3 of FIGURE 1, FIGURE 4 is a section on line 4—4 of FIGURE 1, and FIGURE 5 is a section on line 5—5 of FIGURE 1.

Referring to the drawing, the assembly is shown as mounted in a case 10 for transmission of driving force from a driving or input shaft 11 supported in bearing 12 to a driven or output shaft 13 supported in bearing 14. The assembly comprises a torque converter unit 15 and a multiple coupling unit 16. For purposes of this description, it will be assumed that the driving shaft 11 rotates in a clockwise direction.

Fixed or mounted on driving shaft 11 is a gear carrier 17 within which are rotatably mounted two series of planetary pinions 18 and 19. Each pinion 18 of one series may, as shown, be mounted with a pinion 19 of the other series on a common shaft 20.

Each pinion 18 is mounted in a recess 21 in the carrier and each pinion 19 is mounted in a recess 22 in the carrier.

Meshing with planetary pinions 18 is sun gear 23, rotatably mounted within the carrier 17 and fixed to driven shaft 13.

Meshing with planetary pinions 19 is sun gear 24, also rotatably mounted in carrier 17 and having a sleeve portion 25 projecting rearwardly from the carrier and through which shaft 13 rotatably extends.

Means for drivably connecting each series of planetary pinions 18 and 19 to respective sun gears 23 and 24 comprises a fluid inlet passage 26 in carrier 17 having an inlet 27 communicating with a body of liquid 28, a series of branches 29 each leading to a recess 21, and a series of branches 30 each leading to a recess 22. Recesses 21 communicate in any suitable manner with a fluid outlet conduit 31 for control of fluid flow therefrom by means of a valve 32. As shown, the means of communication comprises a fluid passage 33 in carrier 17 leading from each recess 21, an axial passage 34 in gear 23 and shaft 13, radial passages 35 leading to annular recesses 36 and 37 in shaft 13 and sleeve 25, radial passages 38 in sleeve 25, and annular recess 39 communicating with duct 31 through a collar 40.

Recesses 22 also communicate in suitable manner with a fluid outlet conduit 41 for control of fluid flow therefrom by means of valve 32. As shown, the communication means comprises a fluid passage 42 in carrier 17 leading from each recess 22, and a passage 43 in gear 24 and sleeve 25 leading from passage 42 to an annular recess 44 in sleeve 25 and which communicates with duct 41 through collar 40.

Valve 32 may be of any suitable type and is arranged to control fluid flow through conduits 31 and 41 by selectively arresting such flow or to permit such flow through outlets 45 and 46, respectively. The valve shown by way of example comprises a hollow cylindrical valve body 47, a valve piston 48 therein, and a manually controlled piston actuating lever 49. The piston has a large diameter portion 50 designed to shut off communication between conduit 31 and outlet 45 in one valve position, an annular recess 51 arranged to establish communication between conduit 31 and outlet 45 in another valve position, another large diameter portion 52 arranged to shut off communication between conduit 41 and outlet 46 in one position of the valve, and an annular recess 53 arranged to establish communication between conduit 41 and outlet 46 in another position of the valve. It will be observed that recess 51 is of considerable axial extent whereby if desired, in conjunction with recess 53, both conduits 31 and 41 may be placed in "open" position, i.e., in outlet communicating condition, at the same time. Further, both conduits may be closed at the same time, or conduit 31 opened and conduit 41 closed (the position illustrated in FIGURE 1).

It will be apparent that, with shaft 11 and carrier 17 rotating and sun gear 23 stationary, fluid will be drawn into the recesses 21 through inlet 27 as a result of revolution of the planetary pinions 18 relative to the sun gear. With fluid outlet passage 31 open, fluid will flow therethrough and sun gear 23 will remain stationary. However, when passage 31 is closed, fluid pressure will gradually build up until sun gear 23 and shaft 13 will rotate with shaft 11 and carrier 17 and at the same speed. It will furthermore be apparent that, with fluid outlet conduit 41 open, sun gear 24 and sleeve 25 will remain stationary but, with conduit 41 closed, sun gear 24 and sleeve 25 will rotate with shaft 11 and carrier 17 and at the same speed.

Referring now to the multiple coupling unit 16, a manually operable control lever 54 has an arm 55 fixed to a collar 56 axially slidable on sleeve 25 and having a toothed flange 57. Collar 56 is movable (by means of lever 54) from its neutral position shown in FIGURE 1 to a forward position in which toothed flange 57 is in locking engagement with the toothed inner periphery 58 of a drum 59 and to a rearward position in which toothed flange 57 is in locking engagement with the toothed inner periphery 60 of a gear carrier 61. It will be apparent that the toothed flange 57 and toothed peripheries 58 and 60 constitute brake means for selectively stopping rotation of drum 59 and gear carrier 61.

Lever 54 also has an arm 62 which extends into a recess 63 in a tubular clutch member 64 splined at 65 to shaft 13 whereby member 64 may be moved from its neutral position shown in FIGURE 1 to a forward position in which a toothed flange 66 of member 64 is in locking engagement with a toothed inner periphery 67 of gear carrier 61 and to rearward position in which the toothed flange 66 is in locking engagement with a toothed inner periphery 68 of a ring gear 69.

It will be apparent that collar 56 and clutch member 64 are subject to simultaneous forward and rearward movement by the lever 54, i.e., in forward position, collar 56 is locked to drum 59 and clutch member 64 is locked to gear carrier 61, and in rearward position, collar 56 is locked to gear carrier 61 and clutch member 64 is locked to ring gear 69.

Gear carrier 61 is rotatably mounted on sleeve 25 by means of bearings 70. Mounted in carrier 61, as by means of shafts 71 are a plurality of planetary gears 72.

Planetary gears 72 are in mesh with a sun gear 73 fixed to sleeve 25 and with ring gear 69 which is rotatably supported on bearings 74 carried by frame member 75 fixed to case 10. Ring gear 69 has a one-way clutch connection 76 with drum 59, such connection being designed to permit clockwise rotation only of the ring gear with respect to the drum. The clutch assembly provided may be of the well known sprag type.

In operation, with lever 54 in forward position, drum 59 is locked to permit clockwise rotation only of ring gear 69 and gear carrier 61 is locked to output shaft 13. Sun gear 73 rotates in a clockwise direction as a result of its fixed connection to sleeve 25 and sun gear 24. Such clockwise rotation of sun gear 73 tends to impart anti-clockwise revolution to the planetary gears 72. However, since ring gear 69 can rotate only in a clockwise direction, gear carrier 61 (and shaft 13) will revolve in a clockwise direction at a reduced speed depending upon the ratio of the sun gear 73 and the ring gear 69.

At any desirable speed of the input shaft 11 and of the output shaft 13, the passage 31 could be restricted to the point where the rotative force applied to shaft 13 by the torque converter unit 15 would exceed that applied to shaft 13 by the gear carrier 61. At this point, ring gear 69 would begin to rotate in a clockwise direction. With both passages 31 and 41 closed, sun gears 23 and 24, gear carriers 17 and 61, and ring gear 69 would revolve as a unit with output shaft 13.

For reverse motion of shaft 13, control lever 54 is moved rearwardly to lock ring gear 69 to shaft 13 and to lock gear carrier 61 against rotation, drum 59 being released. Pursuant to opening of conduit 31 by actuation of valve 32, and with clockwise rotation of sun gear 24, sleeve 25, and sun gear 73, planetary gears 72 will rotate in an anti-clockwise direction. Gear carrier 61 being locked, gears 72 will drive ring gear 69 and shaft 13 (as well as elements 76 and 59) in an anti-clockwise direction at a reduced speed depending upon the ratio of sun gear 73 and ring gear 69.

To recapitulate briefly, the operator, desiring to drivably connect shafts 11 and 13 in the same direction of rotation (i.e., to move forwardly from a stationary position if the assembly is the transmission unit of a motor vehicle) firstly places control lever 54 in a forward position, then actuates valve 32 to close passage 41 and to gradually close passage 31. This will cause initial rotation of shaft 13 at low speed from rotation of sun gear 24. As road speed increases, passage 31 is gradually restricted by valve 32 to cause driving force from sun gear 23 to be applied directly to shaft 13. When both passages 31 and 41 are closed, at sufficient road speed, substantially unitary drive occurs between shafts 11 and 13. The same procedure is followed in reversing with the exception that reverse rotation of shaft 13 is always effected through sun gear 24 and not through sun gear 23.

It will be apparent that the valve 32 may be subject to automatic instead of manual control.

I claim:
1. A transmission assembly comprising, in combination with an input shaft and an output shaft, a case adapted to contain a body of fluid, a gear carrier in said case fixed to said input shaft, a first and a second series of planetary gears mounted in said carrier, a first sun gear fixed to said output shaft and meshing with said first series of planetary gears, a second sun gear rotatably mounted on said output shaft and meshing with said second series of planetary gears, said carrier having walls enclosing all of said planetary gears and forming a plurality of recesses therein each receiving one of said planetary gears, said carrier having first and second fluid inlet passages communicating with the interior of said case for reception of fluid from said body of fluid, said first fluid inlet passage leading to said recesses of said first series of gears and said second fluid inlet passage leading to said recesses of said second series of gears, said carrier also having a first fluid outlet passage leading from said recesses of said first series of gears and a second fluid outlet passage leading from said recesses of said second series of gears, a first conduit communicating with said first fluid outlet passage, a second conduit communicating with said second fluid outlet passage, a valve in said conduits and having a member movable to initially open both said conduits, then to close said first conduit, and subsequently to close both said conduits, and a multiple coupling device comprising a third sun gear fixed to said second sun gear and rotatable therewith, a rotatably mounted gear carrier having a third series of planetary gears therein meshing with said third sun gear, a rotatably mounted ring gear meshing with said third series of planetary gears, and means for selectively coupling and uncoupling said ring gear with said output shaft and for simultaneously locking and unlocking said last-mentioned gear carrier against rotation.

2. A transmission assembly comprising, in combination with an input shaft and an output shaft, a case adapted to contain a body of fluid, a gear carrier in said case fixed to said input shaft, a first and a second series of planetary gears mounted in said carrier, a first sun gear fixed to said output shaft and meshing with said first series of planetary gears, a second sun gear rotatably mounted on said output shaft and meshing with said second series of planetary gears, said carrier having walls enclosing all of said planetary gears and forming a plurality of recesses therein each receiving one of said planetary gears, said carrier having first and second fluid inlet passages communicating with the interior of said case for reception of fluid from said body of fluid, said first fluid inlet passage leading to said recesses of said first series of gears and said second fluid inlet passage leading to said recesses of said second series of gears, said carrier also having a first fluid outlet passage leading from said recesses of said first series of gears and a second fluid outlet passage leading from said recesses of said second series of gears, a first conduit communicating with said first fluid outlet passage, a second conduit communicating with said second fluid outlet passage, valve means in said conduits for opening and closing thereof, and a multiple coupling device coupling said second sun gear with said output shaft comprising a third sun gear fixed to said second sun gear and rotatable therewith, a rotatably mounted gear carrier having a third series of planetary gears therein meshing with said third sun gear, a rotatably mounted ring gear meshing with said third series of planetary gears, brake means engageable with said ring gear and having a forward position permitting rotation of said ring gear in one direction only, a neutral position, and a reverse position preventing rotation of said last-mentioned gear carrier, clutch means having a forward position drivably connecting said last-mentioned gear carrier and said output shaft, a neutral position, and a reverse position drivably connecting said ring gear and said output shaft, and a control device operable to selectively and simultaneously place said brake means and said clutch means in each of said positions.

3. A transmission assembly as defined in claim 2, wherein said brake means comprises a rotatably mounted drum, a one-way clutch connecting said drum and said ring gear, and means carried by said control device and having selective locking engagement with said drum and with said second gear carrier.

4. A transmission assembly as defined in claim 2, wherein said clutch means comprises a member splined on said output shaft and connected to said control device for axial movement on said output shaft, said member having selective locking engagement with said second gear carrier and with said ring gear.

References Cited in the file of this patent
UNITED STATES PATENTS

| | | |
|---|---|---|
| 1,882,222 | Lewis | Oct. 11, 1932 |
| 2,730,217 | Bower | Jan. 10, 1956 |
| 2,774,257 | Tyler | Dec. 18, 1956 |

FOREIGN PATENTS

| | | |
|---|---|---|
| 427,956 | Great Britain | May 2, 1935 |